Feb. 12, 1924.  1,483,717
D. G. CHRISTMAN
GUARD FOR ACCELERATOR PEDALS
Filed Nov. 6, 1922

INVENTOR.
Durillo Grant Christman

Patented Feb. 12, 1924.

1,483,717

UNITED STATES PATENT OFFICE.

DUVILLO GRANT CHRISTMAN, OF ENDICOTT, NEW YORK.

GUARD FOR ACCELERATOR PEDALS.

Application filed November 6, 1922. Serial No. 599,226.

*To all whom it may concern:*

Be it known that I, DUVILLO GRANT CHRISTMAN, a citizen of the United States, residing in the village of Endicott, in the county of Broome and State of New York, have invented new and useful Improvements in Safety Devices for Automobile Accelerator Pedals, styled in this specification a Guard for Accelerator Pedals, and of which the following is a clear and full description.

On most automobiles having a regulation sliding gear shift controlled by the customary clutch and brake pedals, there is generally provided a small pedal located adjacent to the brake pedal, for the control by the foot of certain adjustments of the carbureter affecting the speed of the engine which propels the automobile, and the operation of this pedal and its consequent effect on the speed of the engine are matters of great importance especially in emergency situations—such as obtain on congested city streets and on railroad or other crossings when accidental speeding up of the engine might cause serious results to one or both, automobile and occupants of same, and it is in an effort to prevent such occurrences that the device herein described has been evolved.

Figure 1:
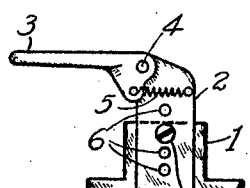
Fig. 1 is a view of the complete device, consisting of a bracket, an adjustable slide, and a pedal guard plate, assembled.

The invention consists of a bracket 1, a vertically movable slide 2, a pedal guard plate 3, pivoted to the slide 2 by screw 4, and held in its normal position by a spring 5. To provide for adjustment to different heights of brake pedals a series of holes 6 are provided in the slide and a bolt 7 clamps the slide to the base through one of these, the whole device being held firmly in position by screws or bolts which pass through holes in the foot board.

Figure 2:
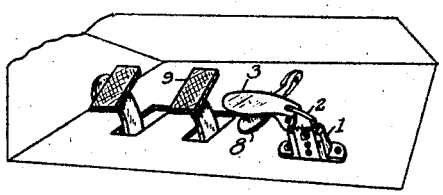
Fig. 2 is a perspective showing the method of installing the guard in combination with the customary pedal on regulation gear shift control.
Figure 3:
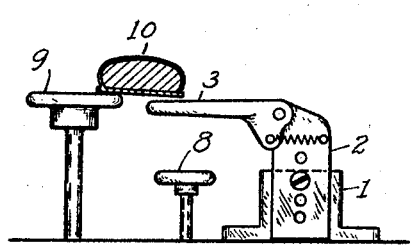
Fig. 3 shows how the pedal guard prevents the foot from slipping off the brake pedal on to the accelerator pedal.

By referring to Fig. 2 it will be seen that the pedal guard is placed adjacent to the brake pedal and in such a position that it is impossible to slide the foot sideways from the brake pedal onto the accelerator pedal without first encountering the pedal guard. To move the foot from the brake pedal to the accelerator pedal 8, the foot must be drawn back slightly and slid under the pedal guard, and this motion would not be made accidently as when the foot slips off the brake pedal, either through carelessness or by a sudden jolt or jar as when going over a railroad crossing or rough road. Fig. 3 also shows an outline section of the shoe 10 partly moved from the brake pedal onto the pedal guard.

Figure 4:
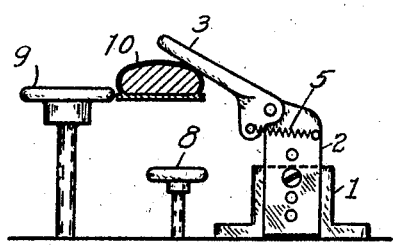
Fig. 4 shows the pedal guard as it is tilted in moving the foot from the accelerator to the brake pedal.

By reference to Fig. 4 it will be seen that the foot may be very readily moved from the accelerator pedal to the brake pedal 9 in the normal way without any retardment by the pedal guard, the pedal guard being raised up by the foot and returning to its normal position by action of spring 5.

To avoid injury to the shoe of the operator, the pedal guard plate is covered or coated as the case may be with a rubber or other suitable covering.

By this description and figures, it will be seen that this device provides a psoitive prevention against the accidental speeding up of an automobile engine, through the agencies noted herein before, and because of this fact, I wish to claim broadly any device of this or similar construction for the purpose herein stated and described.

What I claim is:

1. A safety device for automobiles, of the character described, consisting of a base to be fastened to the floor board, of an upright member attached thereto, of a stop on said upright member, a pedal pivotally mounted on the upright member, yielding means for holding said pedal against said stop, the stop limiting the downward movement of the pedal beyond a predetermined point, as and for the purpose described.

2. In a device to guard against the accidental operation of the accelerator pedal of an automobile, the combination of a base to be fastened to the floor board, an adjustable slide fastened thereto, a pedal hinged at or near the upper end of slide, the slide forming a stop in one direction for the pedal, against which stop it is yieldingly held by a tension spring.

3. In a device of the character described, the combination of a base to be fastened to the floor board, of a guard pedal pivoted to the upper end of a slide adjustable to different heights of brake pedals, of a stop on the slide preventing downward motion of the guard pedal in the direction of the accelerator pedal, but allowing of motion in an upward direction away from accelerator pedal, a spring to return pedal to its position of rest against stop on slide, after foot has been moved directly from accelerator to brake.

4. In a device of the character described, the combination of a base to be fastened to the floor board, a slide attached to the base, a series of holes in the upright portion of the slide, said holes forming vertically adjusting means for the slide, a clamp bolt entering one of said holes and a similar hole in the base, a guard pedal pivotally mounted to the slide and a spring for holding guard pedal against stop on slide.

In witness whereof I affix my signature.

DUVILLO GRANT CHRISTMAN.